April 23, 1968        F. A. GROTH        3,379,141
METHOD AND APPARATUS FOR FORMING PIZZA SHELLS
Filed June 14, 1965        2 Sheets-Sheet 1
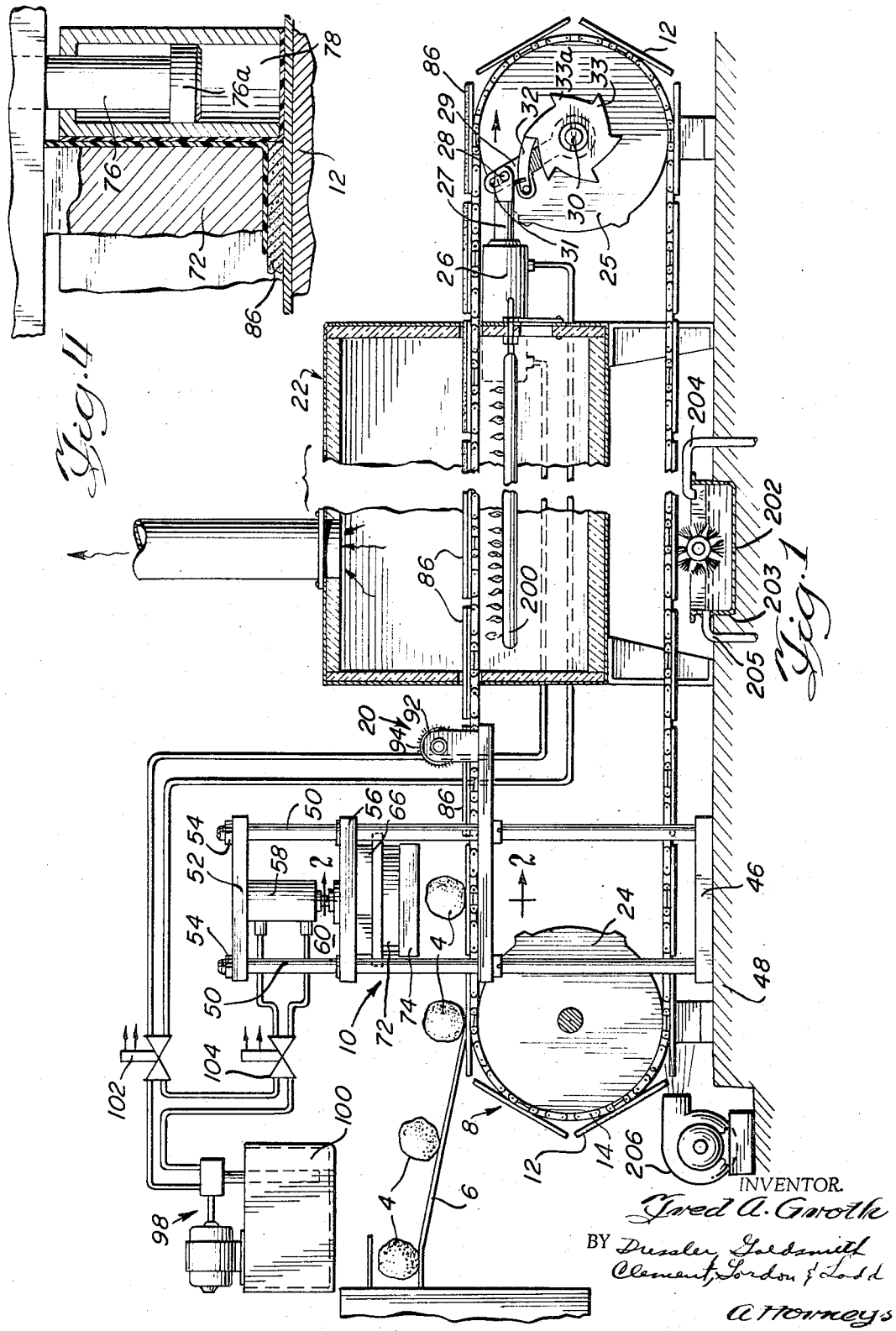
INVENTOR.
Fred A. Groth
BY Dressler, Goldsmith
Clement, Gordon & Ladd
Attorneys

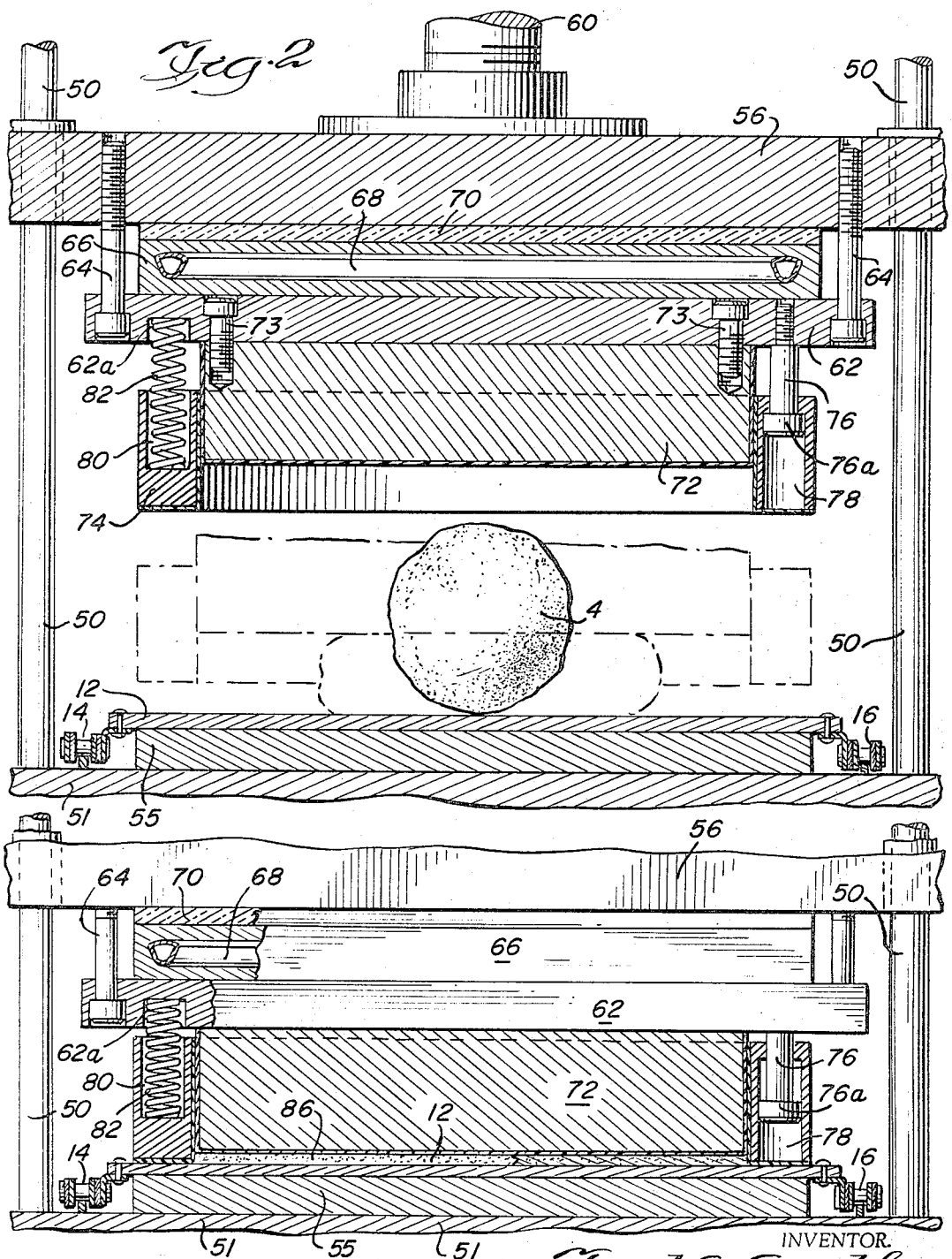

United States Patent Office 3,379,141
Patented Apr. 23, 1968

3,379,141
METHOD AND APPARATUS FOR FORMING
PIZZA SHELLS
Fred A. Groth, Chicago, Ill., assignor to Pasquale Associates, Inc., a corporation of Illinois
Filed June 14, 1965, Ser. No. 463,521
6 Claims. (Cl. 107—4)

ABSTRACT OF THE DISCLOSURE

A method and apparatus are disclosed for transforming a ball of low shortening dough wherein the ingredients are dispersed in a random fashion characterized by grainy hard bread dough texture into dough having attributes of high shortening dough. The apparatus includes a press located along an indexing plate conveyor and including an internally heated platen, an annular ring carried in lost motion connection from the ring and a spring working between the platen and ring to locate the ring in confining relation to the dough ball on each conveyor plate. The platen flattens the dough against the conveyor plate under high pressure and while the dough is positively confined by the annular ring to transform the low shortening dough to a dough wherein the ingredients are dispersed in a uniform fashion and are characterized by a flaky pie crust dough texture.

This invention relates to a method and apparatus for forming dough into shells for pizza pies, or the like. It is particularly directed to the transformation of low shortening dough into a flaky pie crust texture versus a grainy hard bread dough texture.

A principal difference between the dough used for baking bread and that used for pies and cakes is in the amount of shortening contained therein. Bread dough contains a relatively small percentage of shortening and the ingredients of such dough include flour, water, salt, sugar, dry milk, lard, and yeast that are dispersed throughout the dough in somewhat random fashion when the dough is made up in batch form. That is to say that the dough does not have the consistent texture that would exist if there was a uniform dispersion of the dough ingredients throughout its mass. In the case of pies or cakes, there is appreciably more shortening used than in bread dough in order to obtain a flaky crust. A rough idea of the percentages of ingredients employed when making pies and cakes would be that the amount of shortening is roughly equal to the weight of the flour with which the shortening is mixed. This increases the likelihood of the shortening being dispersed throughout the mass, which insures that the crust will have the desirable characteristics attendant with high shortening content. It can be appreciated that if low shortening dough can be processed to have the attributes of high shortening dough without requiring the addition of any more shortening, a substantial advance in the art will have been made. The cost saving of such a contribution to the art is obvious. Typical of applications to which this can be put would be in the production of pizza crusts or pie shells. In addition, provision must be made to permit the gas created by the dough to escape from the shell or pizza crust. Also, if it was desired to prebake or blanch the item to permit storage before final usage, this could be done without any great difficulty.

In accordance with the present invention, there is provided a method and apparatus for transforming a low shortening dough, such as bread dough, into a dough having the attributes of a high shortening dough, shape it into the form of a pizza shell and prebake same. The invention is particularly directed to the production of a pizza crust, but obviously this is merely exemplary since it is adaptable to other uses, if such is desired. The primary principle involved is the application of high pressure to a mass of low shortening dough in a heated mold in order to give it the attributes of high shortening dough. This process tends to disperse the various ingredients of the low shortening dough into a generally uniform pattern throughout the dough mixture. In the instant case, the low shortening dough is compressed, under substantial pressure, in an enclosed heated area shaped to define a pizza shell. The shell so formed is then perforated to permit the escape of gas from the pizza shell during a subsequent prebaking operation. The shell is then moved through a conventional convection oven where the prebaking takes place.

In the apparatus herein employed, the dough ball and subsequently formed pizza shell is moved in an intermittent motion by means of a hydraulically operated ratchet type drive mechanism. The control system is accurately programmed to permit the dough to be compressed into shell form and to be subsequently retained in the oven the desired increment of time to enable it to be baked to the precise condition desired.

Other advantages and features of the invention will be seen by referring to the attached drawings, in which:

FIGURE 1 is a view partially in section showing an apparatus for taking a ball of low shortening dough and transforming it into a pizza crust having the attributes of high shortening dough;

FIGURE 2 is an enlarged sectional view taken along line 2—2 of FIGURE 1 showing the lower portion of the press unit used for compressing the dough;

FIGURE 3 is a view similar to FIGURE 2 showing the position of the various elements when the pizza shell is formed; and FIGURE 4 is an enlarged view of the lower right-hand section of FIGURE 3.

Referring first to FIGURE 1, there is illustrated a divided 2 which is adapted to receive a large quantity of dough and form the dough into balls 4 of a predetermined weight that are subsequently directed to the novel apparatus wherein they are shaped, formed and prebaked into a pizza crust. In order to obtain an eight-ounce pizza, the balls of dough are made nine ounces in weight. This is necessitated by the fact that one ounce is lost through evaporation in the oven.

Upon leaving the divider 2, the dough ball 4 is directed onto a ramp 6 from where it moves onto a conveyor 8 that is intermittently driven through the action of a drive to be discussed in detail hereinafter. As illustrated, the conveyor 8 is made up of a plurality of aluminum plates 12 that are connected to a pair of spaced drive chains 14, 16 (see FIGURES 2 and 3). The conveyor 8 moves the dough through various stages, including the forming press 10, wherein it is compressed into a circular pizza shell, a docking assembly 20, wherein the shell is perforated to permit the release of gas during the baking operation, and then through an oven 22, wherein it is baked. Additional apparatus for handling the shells is not shown and forms no part of the present invention.

The aluminum plates 12 of the conveyor are spaced apart in a longitudinal direction a sufficient amount to facilitate movement of the conveyor about longitudinally spaced driving sprockets. The plates 12 are sized to accommodate a maximum size pizza shell, for which size the forming press 10 is also constructed. It is obvious, of course, that the size of the forming press can be varied as desired by changing molds.

The dough balls 4 are deposited on each of said plates in succession and are formed into pizza shells. Suitable mechanisms can be provided to feed the dough onto the plates at the required time interval. Thus, if a maximum size pizza shell of sixteen-inch diameter is to be formed, the aluminum plates are made sufficiently large to accommodate same.

The conveyor 8 is moved intermittently by the chains through pairs of longitudinally spaced sprockets 24, 25 whereon chains 14 and 16 are mounted. The diameter of the sprockets is sufficiently large to facilitate movement of the plates thereabout with sufficient clearance to prevent binding. The intermittent driving action of the conveyor is accomplished by means of a hydraulically operated ratchet mechanism which moves the sprockets 25 the desired increment after a preselected time interval. The timing is set to enable the dough to be compressed into a pizza shell within the forming press and the press components withdrawn before the shell is moved longitudinally.

Briefly, the aluminum plate 12 containing a ball of dough 4 is moved into the forming press, the press is operated to compress the dough into a sheet, the press is withdrawn, and thereafter the conveyor is moved to move the pizza shell out from the press and direct another plate having a ball of dough thereon into position.

Returning now to the drive mechanism for the conveyor, it is seen that there is provided a double acting cylinder 26 disposed adjacent the drive sprockets 25. From one end of the cylinder 26 extends a piston rod 27 that has secured thereto a pin 28 located in a slot 31 formed in the outer end of an arm 29. The other end of arm 29 is rotatably mounted on a shaft 30. Secured to arm 29 at an intermediate portion thereof is spring loaded pawl 32 that is positioned to engage the ratchet teeth 33a of ratchet wheel 33. The ratchet wheel is secured to shaft 30 and thus rotation thereof will drive the conveyor 8. The stroke of piston rod 27 is designed to rotate sprocket 25 clockwise the required amount to remove one plate 12 from the forming press and position a second plate therein. The control mechanism for actuating hydraulic cylinder 26 will be discussed hereinafter.

As previously indicated, the dough ball 4 is moved by the conveyor 8 to the forming press 10, wherein the ball is subjected to high pressure to give low shortening dough the attributes of high shortening dough.

The press 10 includes a base plate 46 that is mounted on a floor 48, or other support, and a plurality of upstanding vertical columns 50. Connected to the upper portion of columns 50 by nuts 54 is a stationary platen 52. Connected intermediate the ends of the press and serving as a support and guide for the conveyor 8 is an intermediate support member 51. In order to provide clearance for the chains 14, 16, a filler plate 55 is positioned therebetween and serves as a support for plates 12 when they are located in the press.

The movable portion of the press includes a reciprocating platen or plunger 56 which is guided by the columns 50 and is reciprocated by a double acting hydraulic cylinder 58 which includes a piston rod 60 that is secured to reciprocating plunger 56.

The details of the operation of the movable forming press can best be seen by referring to FIGURE 2. As shown therein, the reciprocating plunger 56 has connected to its undersurface, at a slight distance therefrom, a mold support plate 62. The support plate is held in position relative to the plunger by bolts 64. Located between the mold support plate 62 and plunger 56 is a heating plate 66 within which is disposed a heating unit 68. The heating plate 66 is insulated from the plunger 56 by an insulator 70. The heating unit 68 is provided to heat the mold and cause the dough to relax and form a shell free from excessive shrinkage. At this point, there is adherence of the dough shell to the aluminum plate so that the shell remains with the plate for subsequent operations. After a short baking cycle, the shell is free from sticking to the plate. It has been found that the foregoing is satisfactorily accomplished if the mold is at a minimum of 200° F. and the plates are close to room temperature. The arrangement for conditioning the plates in this manner will be discussed in detail hereinafter.

Secured to the undersurface of the mold plate 62 by bolts 73 is a cylindrically shaped center mold member 72. The circumference of center member 72 defines the outer periphery of the pizza shell to be formed by the forming press. Surrounding the center mold member 72 and serving to restrain the dough beneath the center mold member is an annular ring 74 which depends from the support plate 62 and is held relative thereto by a plurality of circumferentially spaced bolts 76 having their head portions 76a located in downwardly extending recesses 78 formed in the ring 74. Interspersed between the bolts 76 and biasing the ring outwardly from plate 62 are circumferentially spaced compression springs 82 having one end portion located in recesses 62a of plate 62 and their other end located in upwardly extending cylindrical recesses 80 formed in annular ring 74. The bottom surface of mold member 72 and inner surfaces of ring 74 are coated with Teflon to prevent sticking of the dough.

When the hydraulic cylinder 58 is operated to move the reciprocating plunger 56 downwardly, the center member 72 engages the dough ball 4 to form it into a pizza crust having an outer diameter equal to the inner diameter of the annular ring 74. During the downward movement of the reciprocating plunger 56, the ring 74 engages the plate 12 of the conveyor 8 to prevent the dough from extruding out between the bottom surface of the ring 74 and the plate 12. The relative movement of the center member 72 permitted by the lost motion action between the plates 62 and rings 74 completes the compressing of the dough ball 4 into the pizza shell 86 in the manner shown in FIGURE 3. The high pressures placed on the dough shell, which are in the order of 200–300 pounds per square inch, plus the 200° F. mold heat, bring about a homogenization of the dough ingredients, which results in a finished product having the characteristics of high shortening doughs, such as pie, or cake dough. Suitable safety mechanisms are provided so that the press cannot come down until a plate is in the press.

The control system for the conveyor and press consists of a motor operated pump 98 which takes liquid from a reservoir 100 and directs it through a series of four-way valves 102, 104 that control the operation of cylinders 26, 58, respectively. The electrical control system, which is essentially conventional in nature and is not illustrated herein, is set up to operate the valve 102 to move piston 27 of cylinder 26 to place an aluminum plate 12 containing a ball of dough 4 into the forming press. When this is completed, the valve 104 is positioned to direct fluid to cylinder 58 to force the platen against the ball 4 located in the forming press to compress it into a flat sheet. When this is completed, the valve 104 is repositioned to operate cylinder 58 to retract the press, after which cylinder 26 is again operated to move the conveyor to locate a subsequent plate and dough ball thereon into the forming press.

As one example of an acceptable timing cycle, the machine can be set to produce ten shells per minute, or 600 per hour. This gives a total time of six seconds between indexing, which time is divided approximately as follows. The press is held closed for four to five seconds, during which period the mold is heated and the dough is released so that it does not shrink excessively. The balance of the time is used for operating the press and indexing the conveyor.

After the pizza shell has been formed, and the press retracted, the conveyor 8 is moved longitudinally to move the pizza shaped dough into engagement with a docking assembly, wherein the outer shell of the pizza dough is perforated to permit the escape of carbon dioxide gas during the baking operation. The docking assembly consists of a cylinder 92 in which are disposed a plurality of rows of circumferentially spaced points 94 that function to perforate the pizza crust. As shown, the docking cylinder is rotated by the pizza shell. However, the docking cylinder can be driven by the movement of the conveyor chain if desired.

When the pizza shell leaves the docker, it is moved into an oven, where the shell is prebaked on both sides to stop the yeast action and effect ample evaporation of the water, so that the pizza shell is stable whereupon it can be stored for reasonable periods without formation of mold or turning sour. Baking also causes the shell to release from the plates.

The oven 22 is a generally conventional gas oven wherein gas is supplied to a burner 200 to bake the pizza shells directed into the oven. The size of the oven is designed to locate the shells in the oven a sufficient length of time to prebake the shell the desired amount. Suitable dampers and flues are provided to efficiently operate the oven.

As previously mentioned, it is desirable that the plates 12 be at room temperature before they enter the press. To accomplish the cooling of the plates after they come out of the oven, a water brush system is located as shown in FIGURE 1. This system consists of a water-containing brush 202 that contacts the outer side of the conveyor plates 12. The brush is rotated through a reservoir containing water received from a water inlet 204. Water is continuously directed into the reservoir through pipe 204 and the water overflow passes out through pipe 205. The plates are subsequently cooled and dried by a blower 206.

Thus, it can be seen that the above apparatus can be used to take a ball of dough having relatively low shortening content and, through the application of pressure and heat, transform it into a product that will have the attributes of dough having a high percentage of shortening content therein. Thus, bread dough can be transformed into "pie" or "cake" dough, with the end result that a pizza shell made out of such a dough will be flaky and have a "pie crust" like texture.

Other apparatus can be used for performing this method and, of course, the invention is not limited to the specific components illustrated and described herein. The various drive mechanisms and press construction, as well as docking assembly and oven unit, are intended to be merely exemplary and not limiting. Various substitutions of these various components will be obvious to one skilled in the art.

It is, of course, intended to cover by the appended claims all such modifications as fall within the true spirit and scope of the invention.

What is claimed is:

1. A press for compressing dough under high pressure onto a plate comprising a platen, means for applying high pressure to said platen, an annular ring secured to said platen with a lost motion connection and adapted to engage said plate, resilient means mounted between said annular ring and said platen, the internal surfaces of said annular ring and platen being coated to prevent sticking of the dough thereto, and heating means located within said platen to release the dough from said ring and platen.

2. Apparatus for forming dough shells comprising a conveyor including a plurality of spaced plates, means for indexing said plates for predetermined movement, a press positioned to compress a ball of dough located on said plates, means for sequentially controlling the operation of said indexing means and press, said press comprising a platen and an annular ring surrounding said platen and adapted to define a confined area therewith, coatings on the internal surfaces of said platen and ring to prevent sticking of the dough thereto, means for applying a high pressure to said platen to compress the dough, means for applying heat to said platen to release the dough from said platen, means for perforating the dough after it has been removed from the press to permit the release of gases generated therein when the dough is baked, means for baking said dough to form a shell, and means for cooling the conveyor to facilitate sticking of the dough to the conveyor when located in the press.

3. Apparatus for forming a pizza shell comprising a conveyor including a plurality of spaced plates mounted on a chain disposed over a pair of longitudinally spaced sprockets, means for directing a ball of dough onto each plate, means for indexing said plates for predetermined movement, a press positioned to compress a ball of dough located on said plates, means for sequentially controlling the operation of said indexing means and press, said press comprising a platen and an annular ring resiliently interconnected to and surrounding said platen and adapted to define a confined area therewith, means for applying a high pressure to said platen to compress the dough, means for applying heat to said platen to release the dough from said platen, means for perforating the dough after it has been removed from the press to permit the release of gases generated therein when the dough is baked, means for baking said dough to form a shell, and means for cooling the conveyor to facilitate sticking of the dough to the conveyor when located in the press.

4. The method of transforming low shortening dough wherein the ingredients are dispersed in a random fashion characterized by grainy hard bread dough texture into dough having attributes of high shortening dough, said method comprising the steps of introducing a ball of low shortening dough into a press, laterally surrounding the ball of dough and applying high pressure of about 200 p.s.i. to about 500 p.s.i. to the ball while in the press to flatten the same into a dough shell while maintaining the shell in a confined area wherein the dough is completely enclosed to transform the dough shell to a dough having the characteristics of high shortening dough and characterized by a flaky pie crust dough texture, applying heat to heat the press to about 200° F. to effect heating of the dough shell concurrently with application of said high pressure, and removing the dough shell from the press.

5. The method of claim 4 wherein the ball of dough is placed on a plate, the plate is moved into the press to introduce the ball of dough therein and to support the same while being transformed into a dough shell and the plate is removed from the press to convey the dough shell therefrom.

6. The method of claim 4 and including perforating the dough shell to permit escape of carbon dioxide during baking thereof, and introducing the shell into an oven to bake the same.

References Cited
UNITED STATES PATENTS

| | | | |
|---|---|---|---|
| 740,346 | 9/1903 | Williams | 107—5 |
| 2,127,651 | 8/1938 | Panther | 107—15 |
| 2,980,012 | 4/1961 | Ramirez | 107—15 X |
| 3,124,083 | 3/1964 | Atwood | 107—15 |

BILLY J. WILHITE, *Primary Examiner.*

J. SHEA, *Assistant Examiner.*